Figure 1:
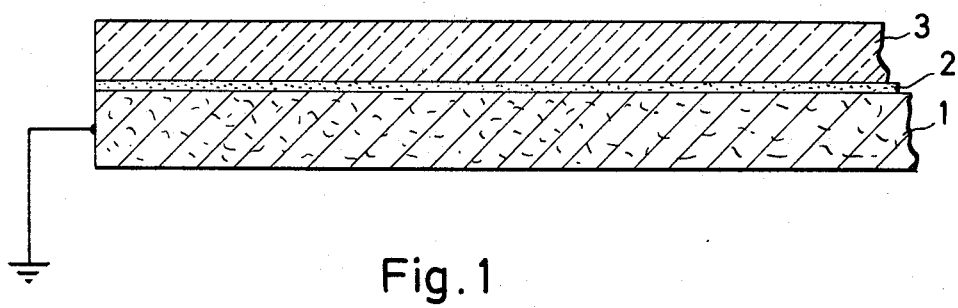

United States Patent [19]

Rochlitz

[11] 3,977,870

[45] Aug. 31, 1976

[54] DUAL LAYER ELECTROPHOTOGRAPHIC RECORDING MATERIAL

[75] Inventor: Jürgen Rochlitz, Breckenheim, Germany

[73] Assignee: Hoechst Aktiengesellschaft, Germany

[22] Filed: May 29, 1975

[21] Appl. No.: 581,999

Related U.S. Application Data

[63] Continuation of Ser. No. 354,439, April 25, 1973, abandoned.

[30] Foreign Application Priority Data

Sept. 21, 1972 Germany............................ 2246256

[52] U.S. Cl. ..................................... 96/1.5; 96/1.6
[51] Int. Cl.² ........................................... G03G 5/06
[58] Field of Search............ 96/1 R, 1 PE, 1.3, 1.5, 96/1.6; 252/501

[56] References Cited
UNITED STATES PATENTS

| | | | |
|---|---|---|---|
| 3,287,123 | 11/1966 | Hoegl...................................... | 96/1.5 |
| 3,384,488 | 5/1968 | Tulagin et al........................... | 96/1.3 |
| 3,549,358 | 12/1970 | Clecak et al........................... | 96/1.5 X |
| 3,598,582 | 8/1971 | Herrick et al........................... | 96/1.5 |
| 3,681,064 | 8/1972 | Yeh....................................... | 96/1 PE |
| 3,791,826 | 2/1974 | Cherry et al........................... | 96/1.5 |
| 3,837,851 | 9/1974 | Shattuck et al....................... | 96/1.5 |
| 3,850,630 | 11/1974 | Regensburger et al................ | 96/1.5 |
| 3,879,200 | 4/1975 | Regensburger et al................ | 96/1.5 |

FOREIGN PATENTS OR APPLICATIONS 2,028,319  12/1970  Germany ............................ 96/1.6

OTHER PUBLICATIONS

Chadwell et al., "Photoconductor," IBM Tech. Discl. Bull., vol. 14, No. 9, Feb. 1972, p. 2781.

Primary Examiner—Roland E. Martin, Jr.
Attorney, Agent, or Firm—James E. Bryan

[57] ABSTRACT

The present invention relates to an electrophotographic recording material consisting of an electroconductive support material with a photoconductive double layer of organic materials which consists of a homogeneous, opaque, charge carrier producing dyestuff layer and of a transparent top layer of insulating materials containing at least one charge transporting compound, which is characterized in that the organic dyestuff layer consists of a compound of the general formula

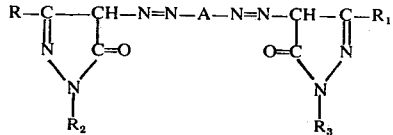

wherein
—A— is a diphenyl or azobenzene group which may be substituted by alkyl with 1 to 4 carbon atoms, alkoxy with 1 to 4 carbon atoms, and/or halogen, R and $R_1$, which may be the same or different, are alkyl with 1 to 4 carbon atoms or carbalkoxyl, in which the alkyl groups have from 1 to 4 carbon atoms, and $R_2$ and $R_3$ are phenyl groups which may be substituted by alkyl with 1 to 4 carbon atoms.

12 Claims, 2 Drawing Figures

FORMULAE
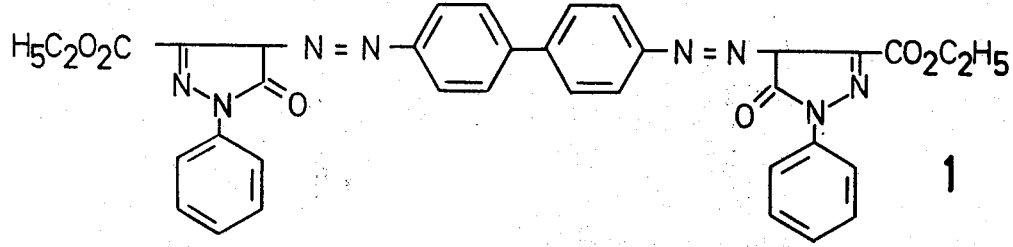
1
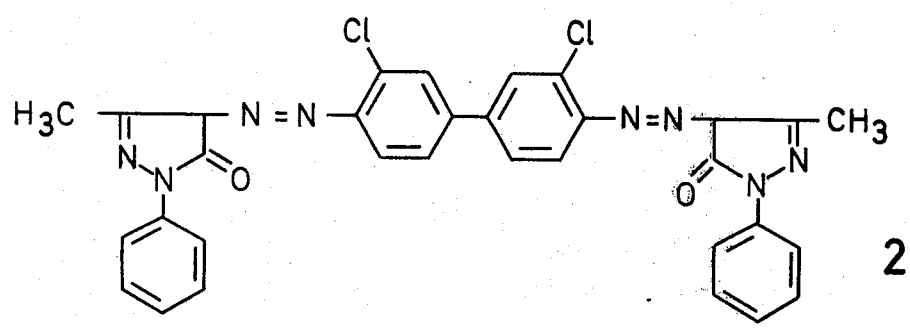
2
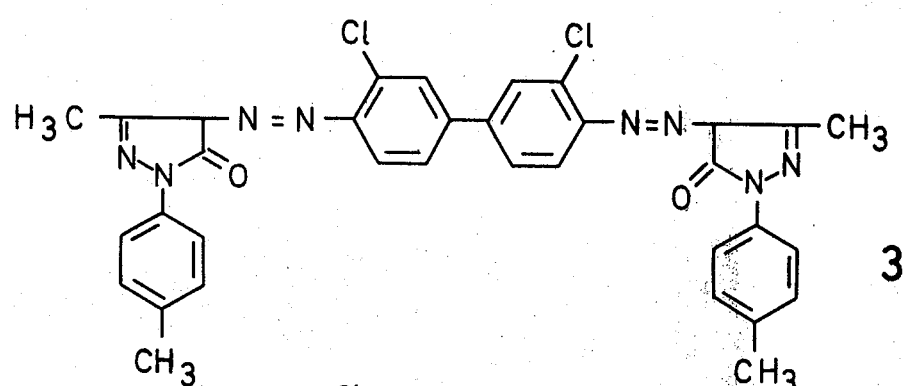
3
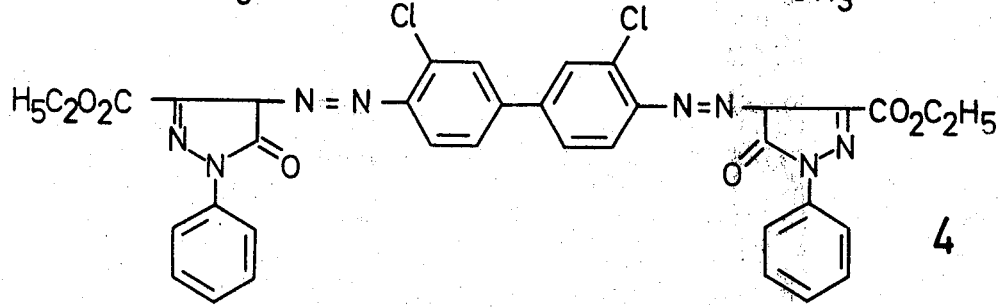
4

FORMULAE
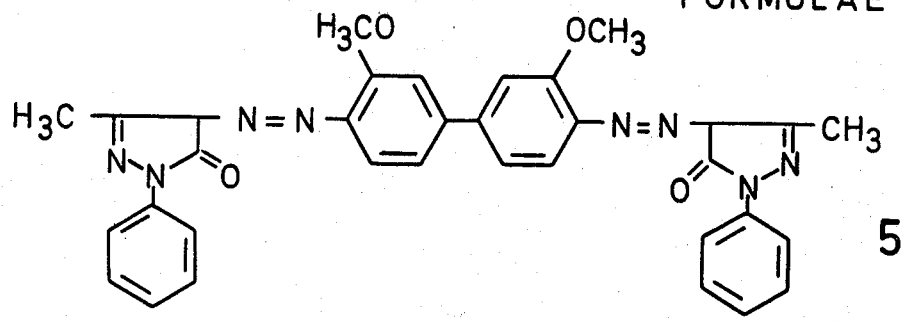
5
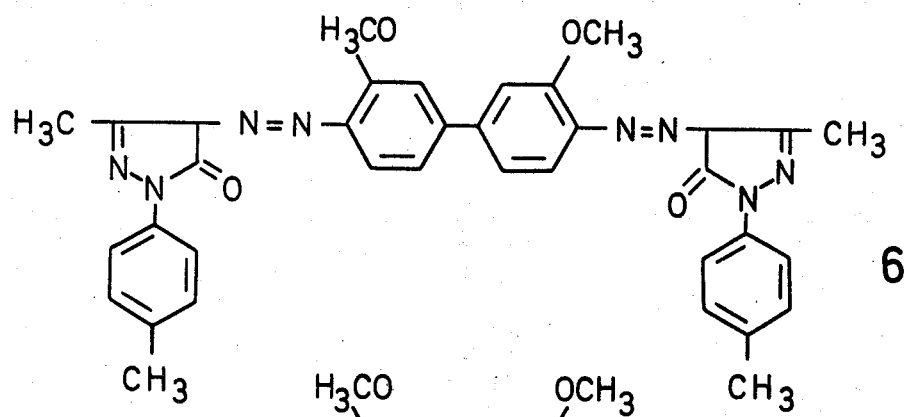
6
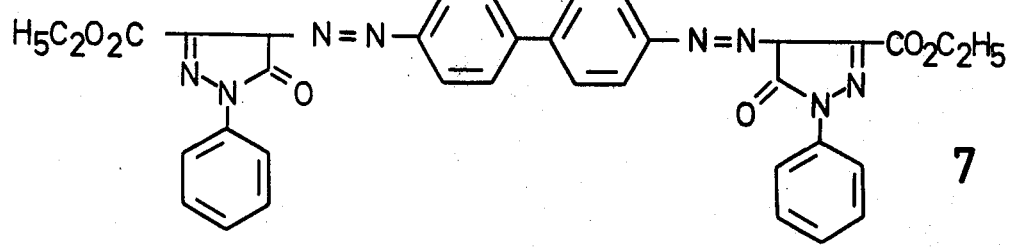
7
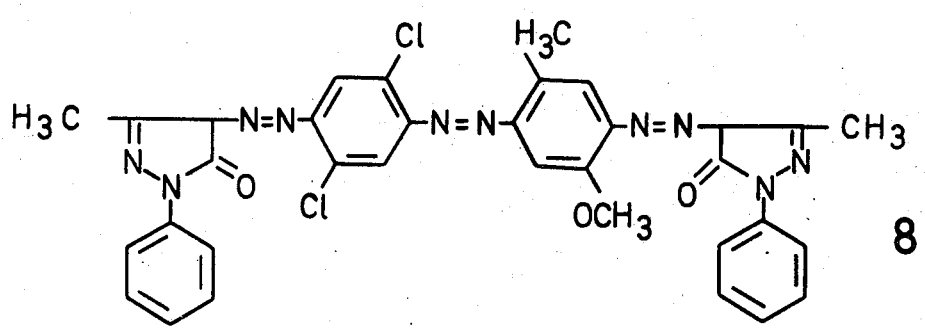
8

FORMULAE
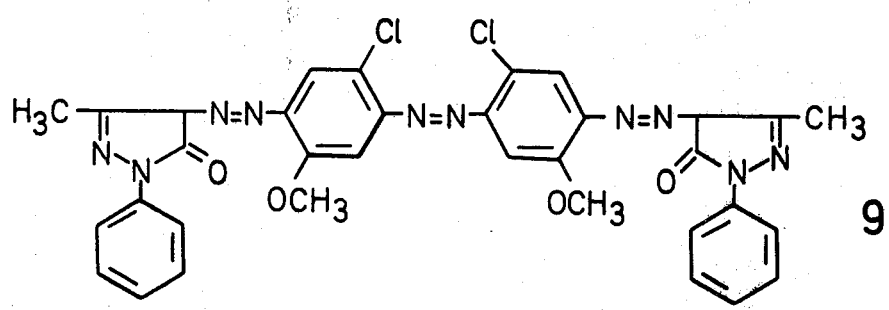
9
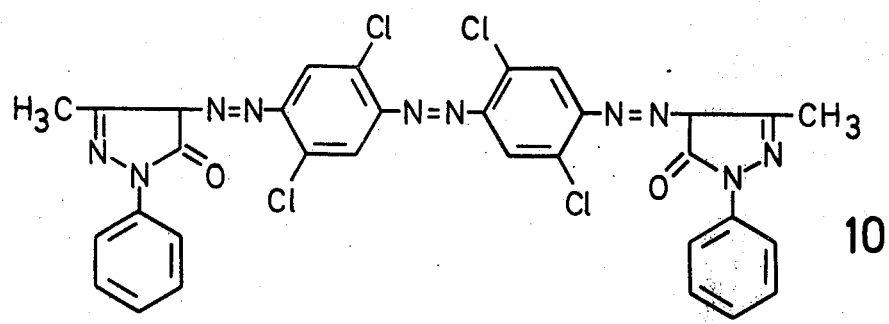
10
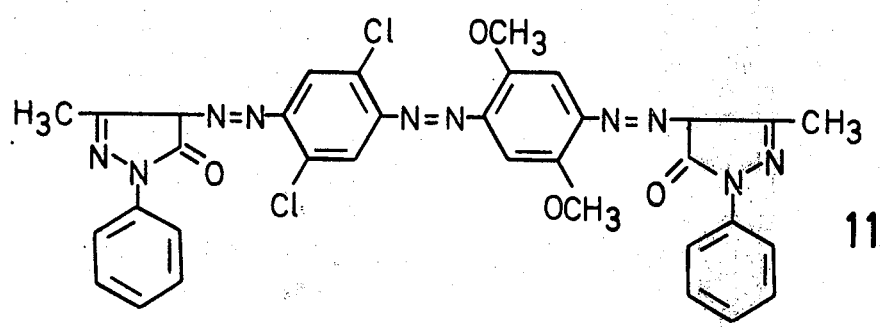
11

DUAL LAYER ELECTROPHOTOGRAPHIC RECORDING MATERIAL

This is a continuation of application Ser. No. 354,439, filed April 25, 1973, now abandoned.

This invention relates to an electrophotographic recording material consisting of an electroconductive support material and a photoconductive double layer of organic materials which consists of a homogeneous, opaque, charge carrier producing dyestuff layer and of a transparent top layer of insulating materials containing at least one charge transporting compound.

It is known from German Offenlegungsschriften Nos. 1,597,877 and 1,797,342 for electrophotographic recording material to extend the spectral sensitivity of selenium layers to the red spectral range of a double layer arrangement, e.g. with phthalocyanine dispersion layers. Disadvantageous are the vacuum vapor depositions of selenium requiring high technical expenditure, the brittleness of comparatively thick selenium layers, the poor adhesion of adjacent heterogeneous constituents in these layers and the only difficulty realizable uniformly wetting coating with the corresponding dispersions. Furthermore, no optimum light-sensitivities can be achieved as a result of the absorption behavior and the different charge conducting mechanisms of selenium and phthalocyanine in the double layer arrangement.

From U.S. Pat. No. 3,573,906, for example, there are also known photoconductive double layers containing an organic, possibly photoconductive, insulating layer between the support material and the vapor-deposited selenium layer in order to impart adhesion. Such a layer construction, however, considerably hinders the necessary charge transport so that, in this case, too, no higher light-sensitivities are obtainable.

Furthermore, from German Auslegeschrift No. 1,964,817, it is known to provide vapor-desposited selenium layers with a layer of an organic, photoconductive insulating material which is substantially insensitive to light in the visible range of the spectrum. According to German Offenlegungsschrift No. 2,120,912, it has also been suggested to use those light-sensitive layer arrangements for electrophotographic recording materials which contain, as the charge carrier producing layer, an inorganic material, such as the sulfide, selenide, sulfoselenide or telluride of cadmium or zinc, and, as the charge carrier transporting layer, an organic material with at least 20 per cent by weight of 2,4,7-trinitro-9-fluorenone. A disadvantage of the production of these layers with inorganic photoconductors is the exact adjustment of the mixtures which is necessary in order to obtain a satisfactorily photoconductive modification of the inorganic materials. Furthermore, the adhesion of selenium to conductive support material, such as to aluminum, is insufficient. Fatigue in repeated charge/exposure cycles does not allow the use in electrophotographic copying devices.

Japanese Pat. Application No. 43-26710 already discloses photoconductive double layers of organic materials on a conductive support. According to that application, a lower, relatively thick layer of a considerably diluted homogeneous solution of a sensitizer in a binder is provided with an upper transparent light-sensitive layer. This layer construction, however, only offers a relatively low sensitivity increase only little meeting technical demands. Another known suggestion according to German Offenlegungsschrift No. 1,909,742 is to repeatedly pour a sensitizer solution over a photoconductive layer and to evaporate the solvent. A disadvantage thereof is the low mechanical resistance of the applied layer as a result of insufficient cohesion and adhesion of the applied sensitizer. Furthermore, repeated coating is cumbersome.

The construction of photoconductive double layers containing a dyestuff layer is also known, e. g. from Belgian Pat. Nos. 763,389 and 763,541, but for this layer construction, top layers are used which allow no sensitivities satisfying highest demands and, as regards adhesion between the dyestuff layer and the top layer, do not represent an optimization and are not sufficiently resistant to mechanical attack, e.g. in electrophotographic copying devices, particularly to that due to the cleaning of the photoconductive layer.

It is the object of the present invention to provide an organic photoconductor layer highly light-sensitive for the xerographic copying procedure which overcomes the described disadvantages and the adhesion of which between the various layers satisfies the highest technical demands, which exhibits substantially no wear or fatigue and which, even after repeated use, may be used again rapidly.

The present invention provides an electrophotographic recording material consisting of an electroconductive support material with a photoconductive double layer of organic materials which consists of a homogeneous, opaque, charge carrier producing dyestuff layer and of a transparent top layer of insulating materials containing at least one charge transporting compound, which is characterized in that the organic dyestuff layer consists of a compound of the general formula

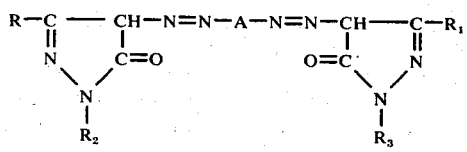

wherein
- —A— is a diphenyl or azobenzene group which may be substituted by alkyl with 1 to 4 carbon atoms, alkoxy with 1 to 4 carbon atoms, and/or halogen,
- R and $R_1$, which may be the same or different, are alkyl with 1 to 4 carbon atoms or carbolkoxyl, in which the alkyl groups have from 1 to 4 carbon atoms, and
- $R_2$ and $R_3$ are phenyl groups which may be substituted by alkyl with 1 to 4 carbon atoms, and that the transparent top layer consists of a mixture of a binder with a charge transporting, monomer, heterocyclic compound substituted by at least one dialkyl amino group or two alkoxy groups and having an extended π-electron system or with a condensation product of 3-bromo-pyrene and formaldehyde.

By means of the invention, it is possible to obtain highly light-sensitive, photoconductive double layers for the electrophotographic recording material of the invention which have a high mechanical resistance and may be arranged on a cylindrical drum, for example, or may circulate as an endless belt without exhibiting special signs of wear and thus are very suitable for the use in electrophotographic copying devices. The high light-sensitivity particularly results from the fact that the charge transporting compound present in the transparent top layer is sensitized by the charge carrier producing dyestuff layer in that the charge carriers, i.e. electrons or holes are taken up by the top layer.

In a preferred embodiment, the organic dyestuff layer has a thickness in the range from about 0.005 to about 2 μm, preferably from about 0.01 to about 2 μm. High concentration of excited dyestuff molecules is achieved thereby in the dyestuff layer and at the boundary surface between the dyestuff layer and the top layer. Furthermore, the adhesion between the electroconductive support material and the top layer is not impaired.

In a preferred embodiment, the transparent top layer has a thickness in the range from about 5 to about 20 μm. This assures a sufficiently high charge.

The structure of the electrophotographic recording material according to the invention is shown in the attached figures.

FIG. 1 shows a material consisting of an electroconductive support 1, an organic dyestuff layer 2, and an organic transparent top layer 3.

Figure 2:
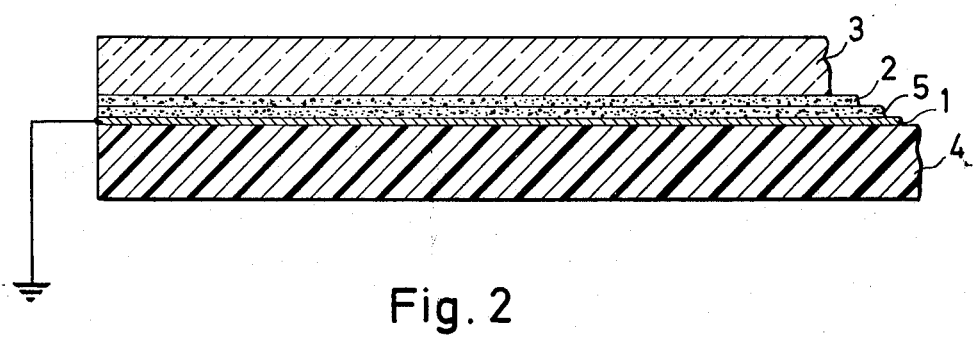

FIG. 2 shows a metallized plastic layer 1,4 as the support, to which an intermediate layer 5 is applied which prevents the injection of charge carriers in the dark. This combination is coated with a photoconductive double layer consisting of the organic dyestuff layer 2 and an organic, transparent top layer 3.

Suitable electroconductive suport materials 1 or 1,4, respectively, are materials that have been hitherto used for this purpose, in particular metal foils, such as aluminum, silver or lead foils, or supports of possibly transparent plastic materials to which a layer of the above metals has been applied by lamination or vapor deposition. The intermediate layer 5 shown in FIG. 2 consists of an organic material, e.g. a polyamide resin, or of a metal oxide layer, e.g. an aluminum oxide layer, produced by a thermal, anodic or chemical process.

The organic dyestuff layer of the electrophotographic material substantially determines the spectral light-sensitivity of the photoconductive double layer of the invention. The dyestuffs listed in the following table, which correspond to the general formula described above, with methyl or methoxy groups and/or chlorine being the preferred substituents for the diphenyl or azobenzene group and methyl being preferred as the substituent at the phenyl group, are given as examples of dyestuffs to be used according to the invention:

| Formula No. | Name of the Dyestuff | Identification |
| --- | --- | --- |
| 1 | Pigment Red 39 | C.I. 21,080 |
| 2 | Permanent Orange G | C.I. 21,110 |
| 3 | Pigment Orange 34 | C.I. 21,115 |
| 4 | "Vulkanechtrot" B | C.I. 21,120 |
| 5 | Pigment Red 41 | C.I. 21,200 |
| 6 | "Vulkanechtrot" G | C.I. 21,205 |
| 7 | Pigment Red 42 | C.I. 21,210 |
| 8 | 4,4'-bis-azo-(2,5-dichloro-2'-methyl-5'-methoxy-azobenzene)-bis-(1-phenyl-3-methyl-pyrazolone-5) | |
| 9 | 4,4'-bis-azo-(2,2'-dichloro-5,5'-dimethoxy-azobenzene)-bis-(1-phenyl-3-methyl-pyrazolone-5) | |
| 10 | 4,4'-bis-azo-(2,2',5,5'-tetrachloro-azobenzene)-bis-(1-phenyl-3-methyl-pyrazolone-5) | |
| 11 | 4,4'-bis-azo-(2,5-dichloro-2',5'-dimethoxy-azobenzene)-bis-(1-phenyl-3-methyl-pyrazolone-5) | |

Among these, the dyestuffs corresponding to Formulae 2, 3, 5, 6, and 8 have proved to be particularly suitable.

The trisazo dyestuffs corresponding to Formulae 8 to 11 are produced by the following process from appropriate starting materials; (the description refers to the dyestuff of Formula 9).

34 parts by weight of 4,4'-diamino-2,2'-dichloro-5,5'-dimethoxy-azobenzene are mixed for about 1 hour with 250 parts by volume of glacial acetic acid and 100 parts by volume of 5 n hydrochloric acid. Diazotization is performed at a temperature between 0° and 5° C, using 41 parts by volume of 5 n sodium nitrite solution, and excess nitrite is destroyed after 1 hour by adding amido sulfonic acid.

In a second vessel, 35 parts by weight of 1-phenyl-3-methyl-pyrazolone are mixed with 500 parts by volume of water and then dissolved by adding 100 parts by volume of 2 n caustic soda solution to the mixture.

The cleared alkaline solution of the coupling component is then added, drop by drop, to the solution of the diazonium salt at a temperature between 5° and 10° C. After termination for 1 hour to 80° C. The brown product is filtered off by suction, washed with water, agains suspended in 500 parts by volume of hot alcohol, drawn off by suction, and finally dried at 60° to 70° C. The resulting dyestuff corresponds to Formula 9.

The organic dyestuff layer must be extremely uniform since only its uniformity guarantees a uniform injection of charge carries into the top layer. To achieve this object, the dyestuff layers are applied according to special coating methods. Such methods are the application by mechanically rubbing the most finely powdered dyestuff material into the electroconductive support material, the application by chemical desposition of the leucobase to be oxidized, for example, the application by electrolytical or electrochemical processes or the gun spray method. The application preferably is performed, however, by vapor depositing the dyestuff in the vacuum. A tightly packed homogeneous coating is achieved thereby.

The tightly packed coating makes it unnecessary to produce thick dyestuff layers for achieving a high absorption. The tightly packed dyestuff molecules and the extremely low layer thickness permit, in a particularly advantageous manner, the transport of charge carriers so that it is completely sufficient to produce the charge carriers at the boundary layer only.

Excitation (1) and charge separation (2) take place in the dyestuff layer according to the following reaction equations:

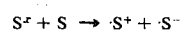

with S — dyestuff molecule
$S^x$ — excited dyestuff molecule, and
$\cdot S^+$; $\cdot S^-$ — dyestuff radical ions.

At the boundary surface between the organic dyestuff layer and the transparent top layer, reactions of the excited dyestuff molecules or the resulting charge carriers in the form of the dyestuff radical ions with the molecules of the charge transport effecting compound in the top layer are possible according to the following equations:

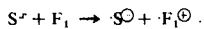  3.

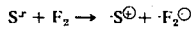  4.

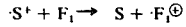  5.

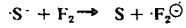  6.

with $F_1$ — donor molecule
$F_2$ — acceptor molecule
$\cdot F_1^{\oplus}, \cdot F_2^{\ominus}$ — donor or acceptor radical ion.

At the boundary surface, sensitizing reactions take place between the transparent top layer and the organic dyestuff layer. The top layer thus is a sensitized organic photoconductor at least in the area of the boundary surface, which leads to the surprisingly high photoconductivity.

Reactions 3 and 5 proceed preferably when the $\pi$-electron system in the top layer is a compound which, as a donor compound, easily can release electrons. This is the case with 2,5-bis-(4-diethylaminophenyl)-1,3,4-oxadiazole, for example. Reactions 4 and 6 are preferably possible with a substance in the top layer which, as an electron acceptor, easily accepts electrons, e.g. 2,4,7-trinitrofluorenone or N-t-butyl-3,6-dinitro-naphthalimide.

Due to the characteristic features of the invention it is sufficient for the efficiency of the dyestuff when, besides its intense absorption, it only has either electron-attracting substituents e.g. $>C=O$, or halogen, or electronrepelling substituents, e.g. $-NH_2$, $-N$-alkyl$_2$ or $-O$-alkyl, depending on whether it is preferably suitable for reactions 3,5 or 4,6. The invention permits charge carrier transport fostered by a particularly low expenditure of energy within the tightly packed dyestuff layer according to the following reactions:

  7.

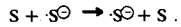  8.

In all conventional sensitizing processes, however, transport via the dyestuff molecules present in low concentration is impeded by their large distance from one another.

Analogous is the procedure of the charge transport in the top layer with:

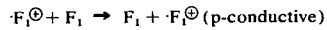  9.

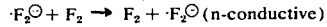  10.

The practical consequence of reactions 1 to 10 is that, in the use of electron donors in the top layer, the double layer arrangement is negatively charged so that reactions 3,5,8,9 can proceed. In the inverse case, layers with electron acceptors in the top layer are positively charged so that reactions 4,6,7, and 10 can proceed.

As already mentioned, the dyestuff layers are very thin so that only very little dyestuff is used. Application by vapor deposition in a high vacuum assures an extremely high uniformity of the dyestuff layer, however, such as can not normally be achieved by conventional coating methods. This uniformity contributes largely to the high light-sensitivity which distinguishes the layers according to the invention, the fact that the charge transport reactions 3 to 6 can proceed without locally disturbing each other (re-combinations) being a further advantage.

The transparent top layer has a high electric resistance and prevents in the dark the flowing off of the electrostatic charge. Upon exposure to light, it transports the charges produced in the organic dyestuff layer.

If it is to be negatively charged, the transparent top layer preferably consists of a mixture of an electron donor compound and a binder. But when the electrophotographic recording material is to be used for positive charging the transparent top layer consists of a mixture of an electron acceptor compound and a binder.

Consequently, in the transparent top layer there are used compounds for charge transport which are known as electron donors or electron acceptors. They are used together with binders or adhesives adapted to the compound for charge transport as regards charge transport, film property, adhesion, and surface characteristics. Furthermore, conventional sensitizers or substances forming charge transfer complexes may be present. But they can only be used in so far as the necessary transparency of the top layer is not impaired. Finally, other usual additives such as levelling agents, plasticizers, and adhesives may also be present.

Suitable compounds for charge transport are especially those organic compounds which have an extended $\pi$-electron system, e.g. monomer aromatic heterocyclic compounds.

Monomers employed in accordance with the invention are those which have at least one substituted amino group or two alkoxy groups. Particularly proved have heterocyclic compounds, such as the oxadiazole derivatives, mentioned in German Pat. No. 1,058,836. An example thereof is in particular the 2,5-bis-(4-diethylaminophenyl)-oxadiazole-1,3,4. Further suitable monomer electron donor compounds are, for example, triphenyl amine derivatives, benzo-condensed heterocycles, pyrazoline or imidazole derivatives, as well as triazole and oxazole derivatives, as disclosed in German Pat. Nos. 1,060,260 and 1,120,875, or carbocyclic compounds.

Formaldehyde condensates of various aromatic compounds, e.g. the formaldehyde condensate of 3-bromopyrene, may also be used.

Besides these mentioned compounds having predominantly a p-conductive character, it is also possible to use n-conductive compounds. These so-called electron acceptors are known from German Pat. No. 1,127,218, for example. Compounds such as 2,4,7-trinitrofluorenone or N-t-butyl-3,6-dinitro-naphthalimide have proved particularly suitable.

Suitable binders with regard to flexibility, film properties, and adhesion are natural and synthetic resins. Examples thereof are in particular polyester resins, e.g. those marketed under the names "Dynapol" (Dynamit Nobel), "Vitel" (Goodyear), which are copolyesters of iso- and terephthalic acid with glycol. Silicone resins as those known under the names SR of General Electric Comp, or Dow 804 of Dow Corning Corp., U.S.A., and which are three-dimensionally cross-linked phenylmethyl siloxanes or the so-called "reactive" resins, e.g. the so-called "DD" lacquers consisting of an equivalent mixture of polyesters or polyethers containing hydroxyl groups and polyfunctional isocyanates, e.g. of the "Desmophen" or "Desmodur" type marketed by Bayer AG, Leverkusen, Germany, have proved particularly suitable. Furthermore, copolymers of styrene and maleic acid anhydride, e.g. those known under the name "Lytron", Monsanto, and polycarbonate resins, e.g. the resins known by the name of "Lexan Greade" of General Electric, U.S.A. may be used. Further, afterchlorinated polyvinyl chlorides, such as "Rhenoflex" (a product of Dynamit Nobel AG., Troisdorf, Germany), and chlorinated polypropylene, such as "Hostaflex" (a product of Farbwerke Hoechst AG, Frankfurt/M., Germany) are also very suitable.

The mixing ratio of charge transporting compound to binder may vary. Relatively certain limits are given, however, by the requirement for maximum photosensitivity, i.e. for the biggest possible portion of charge transporting compound, and for crystallization to be prevented, i.e. for the biggest possible portion of binder. A mixing ratio of about 1 : 1 parts by weight has proved preferable, but mixing ratios from about 3 : 1 to 1 : 4 or above, depending on the particular case, are also suitable.

The conventional sensitizers to be used additionally may advantageously foster charge transport. Moreover, they may produce charge carriers in the transparent top layer. Suitable sensitizers are, for example, Rhodamine B extra, "Schultz, Farbstofftabellen" (dyestuff tables), 1st volume, 7th edition, 1931, No. 864, page 365, Brilliant Green, No. 760, page 314, Crystal Violet, No. 785, page 329, Victoria Pure Blue, No. 822, page 347, are Cryptocyanine, No. 927, page 397. In the same sense as act the sensitizers may also act added compounds which form charge transfer complexes with the charge transporting compound. Thus, it is possible to achieve another increase of the photosensitivity of the described double layers. The quantity of added sensitizer or of the compound forming the charge transfer complex is so determined that the resulting donor acceptor complex with its charge transfer band still is sufficiently transparent to the light absorbed by the organic dyestuff layer below. Compounds which may be used as electron acceptors are, for example: 3,5- and 3,4-dinitro-benzoic acid, tetrachlorophthalic acid anhydride, 2,4,7-trinitro-fluorenone, 3,6-dinitro-naphthalic acid anhydride, and N-substituted imides of 3,6-dinitro-naphthalic acid, such as the N-t-butyl-3,6-dinitro-naphthalic acid imide. Optimum concentration is at a molar donor/acceptor ratio of about 10 : 1 to about 100 : 1 and vice versa.

The addition of adhesives as binders to the charge transporting compounds already yields a good photosensitivity. In this case, low-molecular polyester resin, such as Adhesive 49,000, Du Pont, has proved particularly suitable.

In the described manner, the top layers have the property to render possible a high charge with a small dark discharge. Whereas in all conventional sensitizations an increase of the photosensitivity is connected with an increase of the dark current, the arrangement of the invention can prevent this parallelity. The layers are thus usable in electrophotographic copying devices with low copying speeds and very small lamp energies as well as in those with high copying speeds and correspondingly high lamp energies.

The invention will now be described more in detail by reference to the examples the values of which are compiled in the table.

For the preparation of the photoconductive double layers, the dyestuffs listed below are vapor-deposited at a reduced pressure of $10^{-3}$ to $10^{-4}$ mm Hg in a vacuum evaporator (type A-1, marketed by Pfeiffer, Wetzlar, Germany) for the periods stated in the table and at the temperatures indicated — which are measured directly at the substance to be vapor-deposited — on a 90 $\mu$m thick aluminum foil mounted at a distance of approximately 15 cm; (in Example 10, a lead foil was used as the support).

The dyestuff layers have a thickness in the range from 0.1 to 2 $\mu$m, measured by means of their extinction according to the following formula Layer thickness $(\mu m) = 10 \, (E/\epsilon) \cdot M \cdot d^{-1}$ wherein E is the measured extinction, $\epsilon$ is the extinction coefficient, M is the molecular weight, and d is the density of the dyestuff.

In Examples 2, 6, and 8 extinctions of 0.45, 0.69, and 1.29, respectively, were found at 552 nm. Assuming a density of $d = 1$, thicknesses of 0.28, 0.43, and 0.9 $\mu$m, respectively, are thus calculated for the various dyestuff layers.

In order to test the electrophotographic properties of the dyestuff layers thus produced, transparent top layers of 5 to 6 $\mu$m thickness are applied to them. For this purpose, 20% tetrahydrofurane solutions of a. 1 part by weight of 2,4,7-trinitrofluorenone and 1 part by weight of a polyester resin, (e.g. "Dynapol L 206", a product of Dynamit Nobel, Troisdorf, Germany)(TNF), or b. 1 part by weight of 2,5-bis-(4-diethylaminophenyl)-oxadiazole-1,3,4 and 1 part by weight of a styrene/maleic acid anhydride copolymer (e.g. "Lytron 820," a product of Monsanto Corp., USA)(To), to which, in some cases, sensitizers, i.e. Rhodamine B extra (RhB) or Brilliant Green (BG), are added in the concentrations indicated in the table, (calculated on the dyestuff content,) are whirlcoated onto the dyestuff layers and the double layers are then dried for 2 to 3 minutes at 110° to 120° C in a drying chamber.

The same top layers are then applied analogously to aluminum foil, to produce zero layers. A comparison of the photosensitivity of the various layers shows that an increase of the photosensitivity by a factor of more than 100 can be achieved by the layers of the present invention.

In order to measure its photosensitivity, each photoconductor layer to be tested is charged to a positive or negative potential by passing it three times through a charging device (e.g. an apparatus of type AG 56, marketed by KALLE AKTIENGESELLSCHAFT, Wiesbaden-Biebrich, Germany) adjusted to 7.5 kV. Subsequently, the layer is exposed to the light of a xenon lamp (type XBO 150 of Osram). In Examples 9 and 10, the light intensity is 487 $\mu$W/cm$^2$. In all other cases, the light-intensity in the plane of measurement is approximately 270 $\mu$W/cm$^2$. The height of the charge (V) and the photo-induced light decay curve of the photoconductor layer are measured by an electrometer (type 610 B, marketed by Keithley Instruments, USA) through a probe by the method described by Arneth and Lorenz in "Reprographie" 3, 199 (1963). The photoconductor layer is characterized by the height of its charge (V) and by the time (T 1/2) after which the charge has dropped to half its original value (V/2).

In Examples 7 and 8, the electrophotographic sensitivity was measured by means of a "Dyntest-90" apparatus (marketed by ECE, Giessen, Germany), and the sensitivity factor $f$ was additionally calculated according to the following formula:

$$f = \frac{U_o}{U_h + \Delta U_D}$$

wherein
$U_o$ is the original voltage,
$U_h$ is the voltage after an exposure of 2 seconds, and
$\Delta U_D$ is the dark decay after 2 seconds.

The factor $f$ indicates by how much the original voltage ($U_o$) of the layer exceeds the voltage ($U_h$) obtainable after 2 seconds' exposure to a tungsten lamp when eliminating the dark decay. In Examples 7 and 8, the sensitivity factor $f$ is 2.38 and 1.38, respectively. In the comparison layers (zero layers) this factor is 1.

In Example 10, $f = 1.34$.

Table

| Ex. | Formula of Dyestuff | Vapor Dep. min/°C | Top Layer | Sensitizer % | Photosensitivity T 1/2 (msec) | Charge (V) |
|---|---|---|---|---|---|---|
| 0 | — | — | To | — | 2100 | −420 |
| 0 | — | — | TNF | — | 11000 | +500 |
| 1 | 1 | 4/300 | To | — | 490 | −800 |
| 2 | 2 | 1/310 | To | — | 190 | −1000 |
| 3 | 3 | 2.5/310 | TNF | — | 155 | +440 |
| 4 | 5 | 1.5/330 | To | — | 175 | −970 |
| 5 | 6 | 2/330 | TNF | — | 64 | +600 |
| 6 | 6 | 2/330 | TNF | 0.3 RhB | 54 | +1300 |
| 7 | 6 | 8/330 | TNF | — | 20 | +750 |
| 8 | 6 | 6/330 | To | — | 115 | −520 |
| 9 | 6 | 4/330 | TNF | — | 25 | +750 |
| 10 | 6 | 4/330 | TNF | — | 40 | +340 |
| 11 | 8 | 4/300 | TNF | — | 205 | +560 |
| 12 | 8 | 4/300 | To | — | 160 | −1250 |
| 13 | 8 | 4/300 | To | 0.3 RhB | 88 | −1150 |
| 14 | 8 | 4/300 | To | 0.05 BG | 102 | −1050 |
| 15 | 9 | 4/300 | To | — | 360 | −1200 |
| 16 | 11 | 4/300 | To | — | 480 | −1150 |

It will be obvious to those skilled in the art that many modifications may be made within the scope of the present invention without departing from the spirit thereof, and the invention includes all such modifications.

What is claimed is:

1. In an electrophotographic recording material comprising an electroconductive support material with a photoconductive double layer of organic materials composed of a tightly packed, homogeneous, uniform, opaque charge carrier producing dyestuff layer prepared by vacuum evaporation of the dyestuff and a transparent top layer of insulating materials containing at least one charge transporting compound, the improvement in which the organic dyestuff layer consists of a compound of the general formula

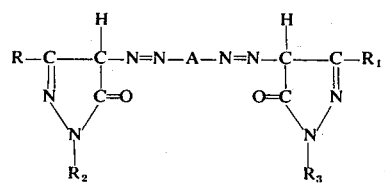

wherein

A is a diphenyl or azobenzene group which may be substituted by alkyl with 1 to 4 carbon atoms, alkoxy with 1 to 4 carbon atoms, and/or halogen, R and $R_1$ which may be the same or different, are alkyl with 1 to 4 carbon atoms or carbalkoxy in which the alkyl groups have from 1 to 4 carbon atoms, and $R_2$ and $R_3$ are phenyl groups which may be substituted by alkyl with 1 to 4 carbon atoms, and in which said transparent top layer consists of a mixture of a binder selected from the group consisting of polyester, copolyester, silicone resin, styrene/maleic anhydride copolymer and polycarbonate resin with a charge transporting, monomeric, heterocyclic compound selected from the group consisting of oxazoles, oxdiazoles, triazoles, imidazoles and pyrazoles substituted by at least one dialkylamino group or two alkoxy groups and having an extended π-electron system, in which the dyestuff layer has a thickness of about 0.05 to about 2 microns and the transparent top layer has a thickness of about 5 to about 20 microns and in which the transparent top layer consists of about a 1 : 1 mixture by weight of the charge transporting heterocyclic compound and the binder, said recording material having a high mechanical resistance and good adhesion between the various layers and being useful in an electrophotographic copying process with negative charging of the top layer if an electron donating compound is used.

2. Electrophotographic material according to claim 1 in which the charge transporting heterocyclic compound is 2,5-bis-(4-diethyl-aminophenyl)-oxdiazole-1,3,4.

3. Electrophotographic material according to claim 1 in which the diphenyl or azobenzene group is substituted by methyl or methoxy groups and/or chlorine, and/or the phenyl group is substituted by methyl.

4. Electrophotographic material according to claim 1 in which the organic dyestuff layer consists of Permanent Orange G, (C.I. 21,110).

5. Electrophotographic material according to claim 1 in which the organic dyestuff layer consists of Pigment Orange 34 (C.I. 21,115).

6. Electrophotographic material according to claim 1 in which the organic dyestuff layer consists of 37 Vulkanechtrot" G (C.I. 21,205).

7. Electrophotographic material according to claim 1 in which the organic dyestuff layer consists of 4,4'-bis-azo-(2,5-dichloro-2'-methyl-5'-methoxy-azobenzene)-bis-(1-phenyl-3-methyl-pyrazolone-5).

8. Electrophotographic material according to claim 1 in which the charge transporting heterocyclic compound is an oxadiazole.

9. Electrophotographic material according to claim 1 in which the binder is a styrene/maleic anhydride copolymer.

10. Electrophotographic material according to claim 1 in which an insulating intermediate layer is disposed between the electroconductive support and the photoconductive double layer.

11. Electrophotographic material according to claim 1 in which the electroconductive support is an aluminum, silver or lead foil, or a plastic film to which an aluminum, silver, or lead layer is applied by vapor deposition or lamination.

12. Electrophotographic material according to claim 1 in which the transparent top layer additionally contains a sensitizer.

* * * * *